T. C. BEST, DEC'D.
J. BEST, ADMINISTRATRIX.
DIE AND SHEARING MECHANISM.
APPLICATION FILED JAN. 7, 1907.
1,008,940.
Patented Nov. 14, 1911.
5 SHEETS—SHEET 1.
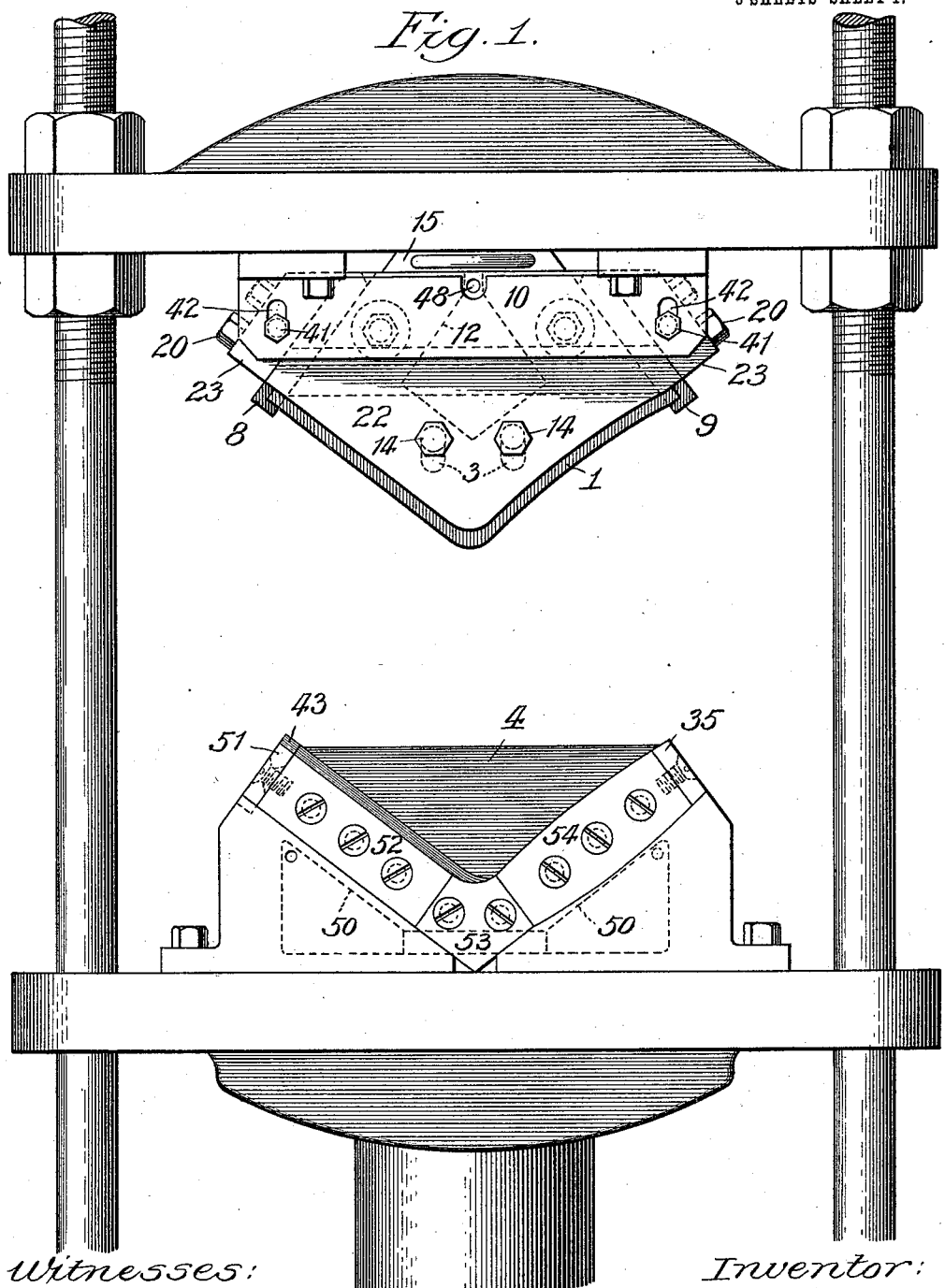
Witnesses:
John Enders.
Chas. H. Buell.
Inventor:
Thomas C. Best,
By Thomas F. Sheridan,
Atty.

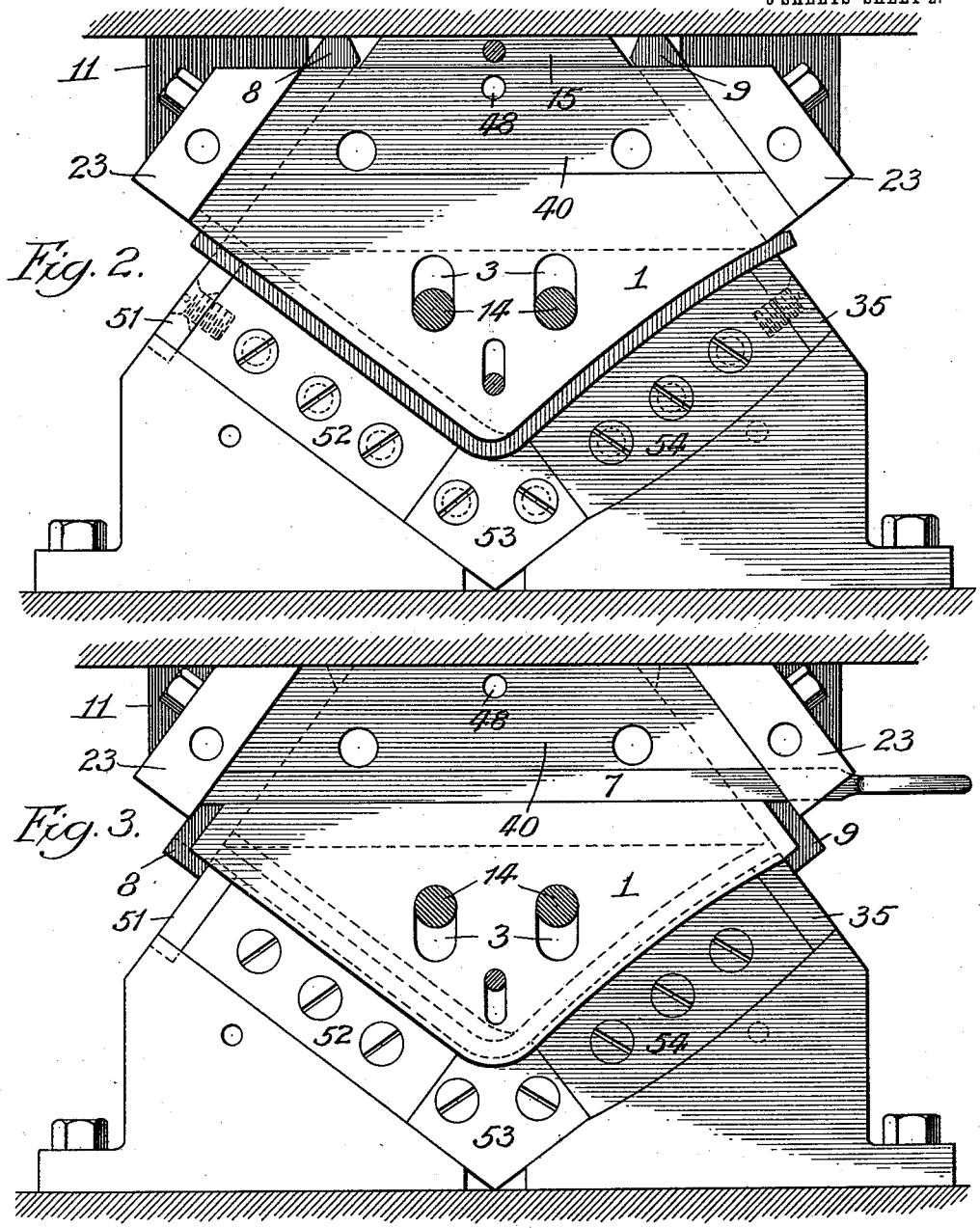

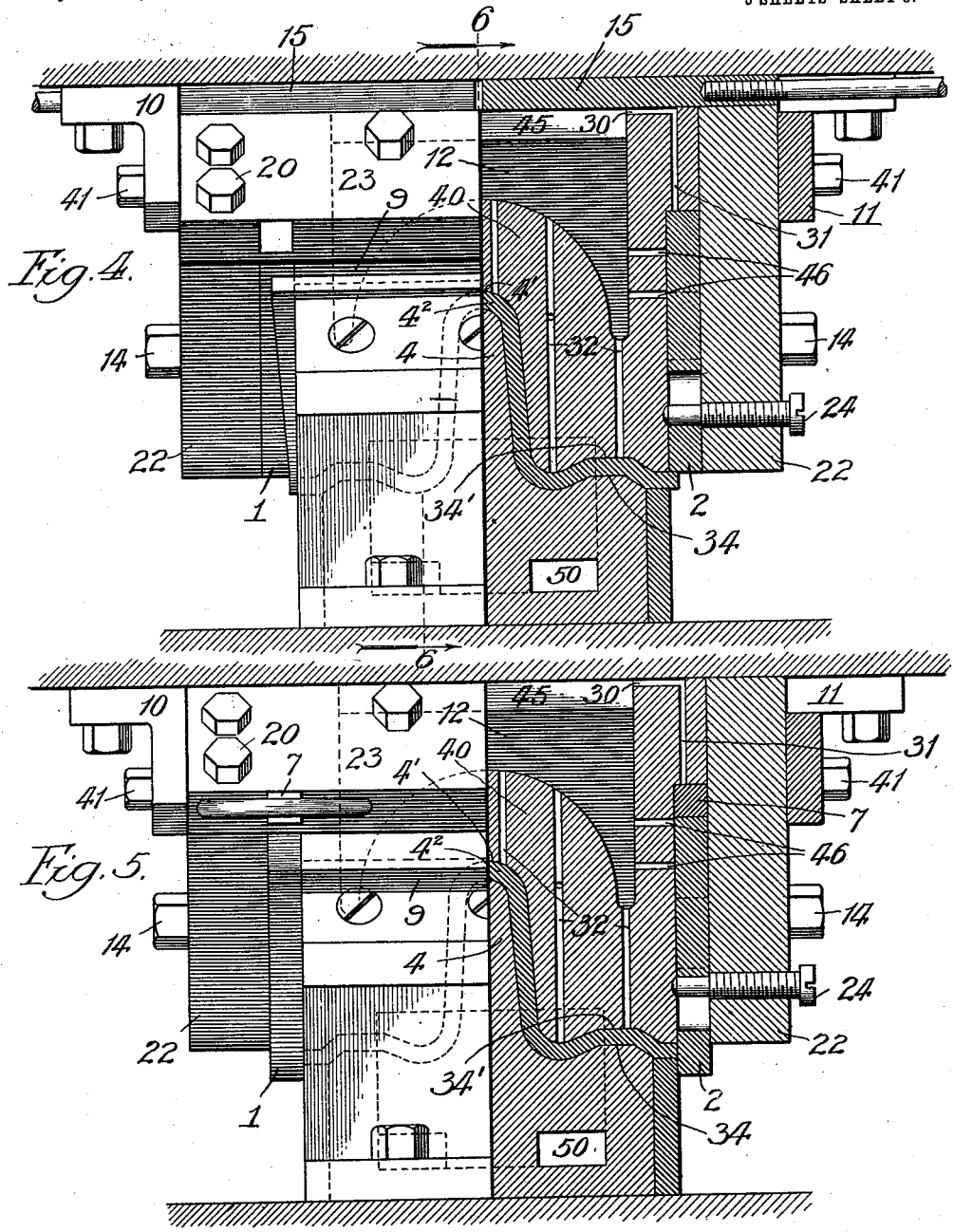

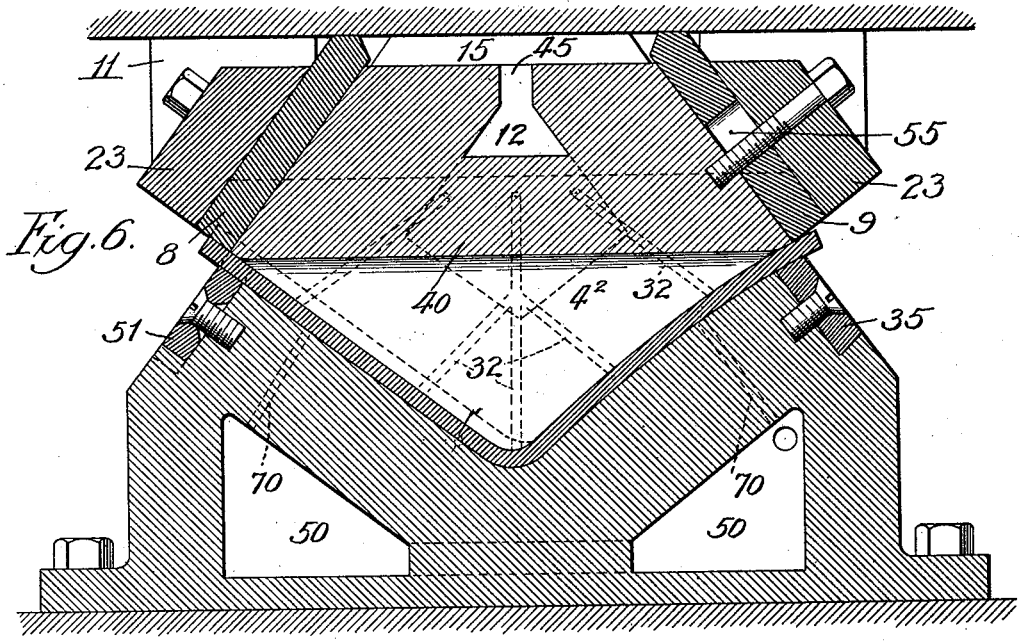
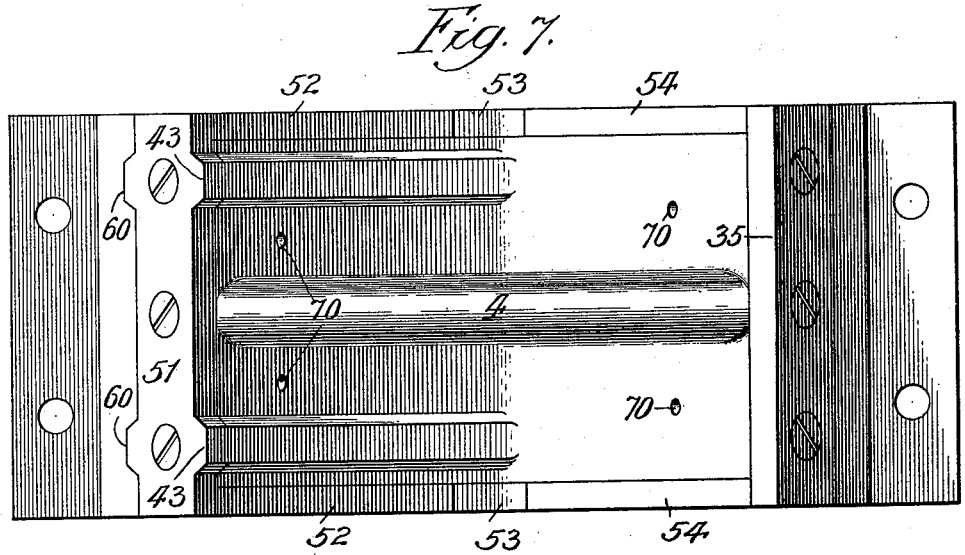

T. C. BEST, DEC'D.
J. BEST, ADMINISTRATRIX.
DIE AND SHEARING MECHANISM.
APPLICATION FILED JAN. 7, 1907.
1,008,940.
Patented Nov. 14, 1911.
5 SHEETS—SHEET 5.
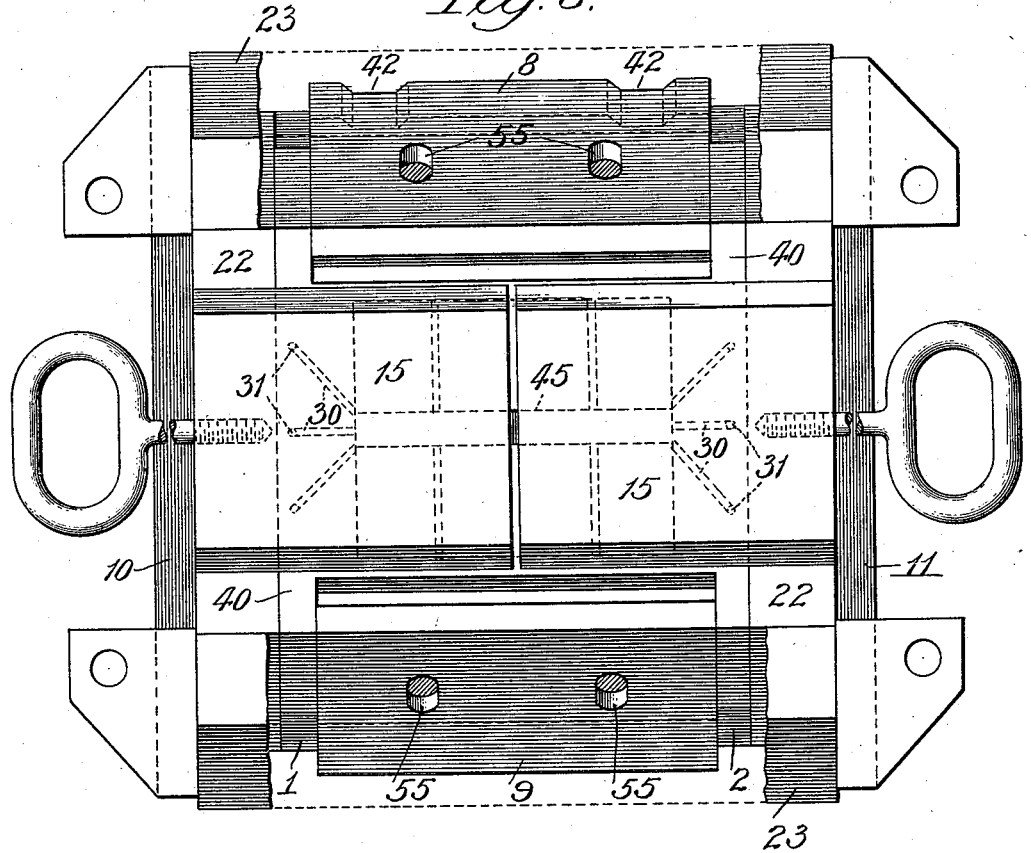
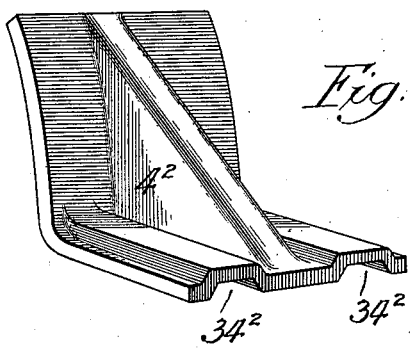
Witnesses:
John Endure,
Chas H. Buell.
Inventor:
Thomas C. Best,
By Thomas F. Sheridan,
Atty.

UNITED STATES PATENT OFFICE.

THOMAS C. BEST, OF CHICAGO, ILLINOIS; JENNIE BEST ADMINISTRATRIX OF SAID THOMAS C. BEST, DECEASED.

DIE AND SHEARING MECHANISM.

1,008,940.  Specification of Letters Patent.  Patented Nov. 14, 1911.

Application filed January 7, 1907. Serial No. 351,218.

*To all whom it may concern:*

Be it known that I, THOMAS C. BEST, a citizen of the United States, residing at Chicago, in the county of Cook and State of Illinois, have invented certain new and useful Improvements in Die and Shearing Mechanism, of which the following is a specification.

The object of my invention is to provide improved means for forming and cutting the edges of metal articles.

In the structure herein illustrated and described the mechanism is designed for the manufacture of boiler brackets, but it will be understood that the invention is equally applicable for the construction of other articles such as structural brackets, etc.

Referring to the drawings—Figure 1 is a front elevation of a die press having the mechanism forming the subject-matter of my invention mounted therein. Fig. 2 is a front elevation similar to Fig. 1, but showing the front plate of the casing of the upper member of the mechanism removed, the shearing blades retracted, and a sheet of metal between the upper and lower members. Fig. 3 is a view similar to Fig. 2, but showing the shearing blades projected to the position occupied by them after trimming the edges of the sheet of metal operated on by the dies. Fig. 4 is a side elevation, showing part of the mechanism in section, the shearing blades being retracted as in Fig. 2. Fig. 5 is a view similar to Fig. 4 and shows the parts in the position represented in Fig. 3. Fig. 6 is a sectional elevation on the line 6 of Fig. 4, looking in the direction of the arrow. Fig. 7 is a plan view of the lower member of the mechanism. Fig. 8 is a plan view of the upper member of the mechanism. Fig. 9 is a perspective view of a finished boiler bracket made by the mechanism illustrated in the preceding views.

Referring to Figs. 1 and 4 of the drawings, the numerals 10 and 11 represent brackets rigidly secured to the upper member of the die press. The upper die 40 is inclosed in a casing formed of the plates 22 and 23, which are suitably secured together, as by bolts 20. The sides 22, 22 of the casing are parallel while the sides 23, 23 converge toward the top. This casing is attached to the brackets 10, 11, by means of bolts 41 passing through slots 42 in said brackets rigidly secured at their inner ends to the casing. By means of this arrangement, the entire casing has a vertical movement relative to the press limited by the length of the slots 42. When the casing is in its uppermost position, the upper face of the die inclosed therein contacts with the upper member of the press. Means are provided in the form of gag plates 15, 15 for retaining the die in its lower position. The gag plates are removable and when withdrawn the die is free to move to its uppermost position for a purpose hereinafter described.

The die 40 is rigidly fixed to the casing. Its front and back surfaces are recessed as shown in Figs. 4 and 5, the recesses being occupied by shearing blades 1 and 2. These shearing blades are attached to the die by means of bolts 14 passing through slots 3 in the shearing blades and rigidly fixed at their inner ends in the die. By this arrangement the dies are movable in a vertical plane to an extent limited by the length of the slots 3. In order to project the blades 1 and 2 beyond the surface of the die, I provide gags 7, which may be inserted in the recesses above the dies, as shown in Figs. 3 and 5.

It will be apparent that when the gag plates 15, 15 are removed and pressure applied, the casing inclosing the upper die will be raised until its upper surface contacts with the under face of the upper member of the press. The shearing knives 8 and 9 being of a length greater than the thickness of the die, their lower edges will project beyond the lower face of the die when the latter is in its upper position with the gag plates removed. The insertion of the gag plate has the effect of increasing the depth of the spaces in which the blades 8 and 9 reciprocate to a sufficient extent to permit them to recede to a point where their lower edges are flush with the under surface of the die. The removal of the gags 15, 15, on the contrary, has the effect of diminishing the thickness of the upper die, thereby shortening the spaces in which the blades 8 and 9 reciprocate and causing their lower edges to project below the lower face thereof when the die contacts with the upper member of the press.

The lower die is surrounded peripherally by shearing blades corresponding in form to those on the upper member and of such size that the upper blades may pass outside thereof. The shearing blades are so arranged that the sheet metal operated on will, after being given its final form, be trimmed in such a manner that its edges will be normal to the adjacent surfaces. This object is accomplished by inclining the upper shearing blades 8 and 9 in the manner shown in the drawings, it being noted that the blades are substantially at right angles to the under surface of the adjacent portion of the die. In the construction shown, the movable shearing blades are attached to the female die, the lower or male die being provided with the stationary shearing blades. The strengthening rib $4^2$ shown in Fig. 9 of the drawings is formed by the elevation 4 upon the lower die and the corresponding depression 4' in the upper die. The corrugations $34^2$ shown in Fig. 9, which are designed for the reception of rollers, are formed in a manner similar to the strengthening rib $4^2$. The elevations 34 on the male die and depressions 34' in the female die are designed for this purpose. The shearing blade 8 and the co-acting blade on the lower die are formed with notches 42 and elevations 43, as shown in Figs. 7 and 8, corresponding in form with the lower member of the finished bracket illustrated in Fig. 9.

For the purpose of keeping the dies and shearing blades cool while in use upon hot metal, I have shown both the upper and lower dies cored and provided with branch connections for circulating water. The form of the cavity in the upper member is illustrated in the drawings. This cavity has an opening 45—shown in dotted lines in Fig. 8—of rectangular form communicating with the upper surface of the die. Holes 31 are drilled from the upper surface of the die to the top of the recesses occupied by the shearing blades 1 and 2, and grooves 30 in the upper surface of the die connect the opening 45 with the drilled holes 31. By this construction, means are provided for permitting the water to flow from the cavity 12 to the shearing blades 1 and 2 when the die is in its upper position contacting with the head of the press. I have also shown branch passages 46 leading from the cavity 12 to the sides of the space occupied by the shearing blades and also openings 32 leading from said cavity to the under surface of the die. By means of the opening 48—shown in Figs. 1 and 2—water may be supplied by means of a flexible pipe, or otherwise. I have also shown a cavity 50 in the lower die which may be supplied with cooling water in the manner similarly described in connection with the upper die. Passages 70 lead from the cavity 50 to the surface of the die.

In operation, the gag plates 15, 15 are placed in position and the gags 7, 7 are removed, as shown in Figs. 2 and 4. When the parts are arranged in this manner, the blades 1, 2, 8 and 9 may all be moved upward to inoperative position, and are so moved when they contact with the metal between the dies. The metal plates are operated on while heated. The circulation of water above referred to prevents the temperature from rising to a point injurious to the temper of the shearing blades. After the heated plate has been properly shaped, the press is eased up and the gags 15, 15 are removed and the pressure again applied. The pressure causes the upper die to move up into contact with the upper member of the press, thereby projecting the blades 8 and 9 below the under surface thereof. This movement causes the blades 8 and 9 to pass from the position shown in Figs. 2 and 4 to that shown in Figs. 3 and 5 the result of which is the shearing off of two edges of the metal plate. The other edges of the plate are similarly sheared off by the blades 1 and 2 in the following manner. The press is again eased up to a height, which will admit of the insertion of the gags 7 and 7 in their position, above the blades 1 and 2. The insertion of the gags 7 and 7 forces the blades 1 and 2 below the surface of the die as illustrated in Figs. 3 and 5. The members of the press are thereupon again brought together, and the shearing off of both sides is accomplished, thus making all brackets a uniform size.

From the foregoing, it will be apparent that the formation of the boiler bracket—Fig. 9—is accomplished by three movements of the press, the first for the purpose of shaping the metal, at which time the shearing blades are retracted, and the second and third for the purpose of shearing the edges, at which time the blades are projected beyond the surface of the die.

One of the important features of the shearing blades is the novel manner in which they are designed. Every shear blade is arranged so that it has two, and in some cases four cutting edges.

In Fig. 2 it will be observed that the upper edges of shear blades 8 and 9 are beveled both ways to an angle corresponding to the lower surface of the top member of the press, so that when one cutting edge of the blade becomes dull, it can be turned over and the other or sharper edge put into service. The upper edge being arranged so that no matter which way the blade is turned the angle of the working surface of the top edge of the blade will be parallel with the lower surface of the upper member of the press. By such an arrangement, the life of the shearing blades are prolonged double that of an ordinary shear blade, having but one cutting edge.

The elongated holes in all of the upper shear blades as shown in Fig. 2 as at 3—3 and Fig. 8 at 55 and 55 answer two purposes. First, to prevent the blades from dropping out and to hold them at the desired height. Second, they allow bolts to pass through the blade and to be secured to the body of the die, thereby holding the shear blade guard 23 firmly up against the shear blade, and preventing the shear blades from springing away from their desired position when cutting heavy plates, which would occur with long blades were it not for some such device. The bottom shear blades are also arranged in a novel way. Blades 35 and 53 in Fig. 1 have two cutting edges, while blades 51, 52 and 54 have four cutting edges. The top and bottom surface of blades 51, 52 and 54 are exactly alike, and the bolt holes are laid out in such a way as to permit them being turned in any direction. When the first edge becomes worn, or dull, it can be turned around and the other edge used. When this becomes dull, the blades can be turned upside down, and the other two edges can be used, until they also become dull. This arrangement is made possible, not only by the holes being laid out in such a manner as to permit their being reversible, but by countersinking the bolt holes on both sides of the blade, which is done in this case. The top and bottom of shear blade 35 are curved and exactly alike. The cutting being done on the narrow edge, hence it has but two cutting edges. When the upper edge becomes dull, it can be turned upside down, and the bottom edge used.

Shear blade 53 has two cutting edges, which is accomplished by the arrangement of the holes in the blade corresponding with the holes on each side of the die, also by countersinking the holes on both sides of the blades, which renders them interchangeable. When the cutting edges of these corner blades become dull, they are changed from one side of the die to the other, thereby providing two cutting edges. Shear blade 51 in Figs. 1 and 7, is provided with projections both top and bottom, the die being cut away at 60 to receive the projections thus holding the blade firmly in position. By providing the projections in both sides of the blade and countersinking the bolt holes on both faces the blade may be inverted and turned end for end, thus utilizing all four cutting edges.

In Figs. 4 and 5, the numeral 24 designates a separator bolt, which is used for the purpose of preventing plates 22 from being jammed against the shear blades 1 and 2 when bolts 14 are screwed up tightly.

While I have described my invention as applied to the manufacture of the boiler bracket shown in Fig. 9, it will be apparent that it is equally adapted for use in other connections.

I claim:

1. A die having a portion of its surface formed by the edge of an independently movable shearing blade.

2. A die having a portion of its surface formed by the edge of a shearing blade and means for projecting said shearing blade beyond the remainder of the die surface.

3. A die having its outer portion composed of movable blades, means for retracting said movable blades flush with the remainder of the die surface in which position the edges of the blades form part of the die surface, and means for projecting said movable parts beyond the remainder of the die surface.

4. A die provided with a recess for a shearing knife, the depth of the recess being such that the knife may recede to inactive position, and means for projecting the knife beyond the face of the die.

5. A die press and die, a movable shearing blade upon the die, and means whereby pressure may be exerted upon the die without actuating the shearing blade.

6. A die press and die, a movable shearing blade mounted upon the die, means for rendering the shearing blade either operative or inoperative when pressure is exerted upon the die.

7. In combination, a die, a movable shearing blade adjacent thereto, and a gag-plate whereby pressure may be transmitted to the shearing blade.

8. A die, an adjacent shearing blade movable relative to the die, and a gag-plate whereby the shearing blade may be projected beyond the surface of the die.

9. A die provided with a movable shearing blade, means whereby the blade may recede to inactive position when the die contacts with the material operated on, and a gag-plate whereby the blade may be projected to its operative position and retained in said position when pressure is exerted upon the material being operated on.

10. A die movably mounted upon one member of a die press, a shearing knife movably mounted upon the die, and means for spacing the die from the press member in such manner as to permit the shearing knife to recede to an inactive position.

11. A die movably mounted upon one member of a die press, a shearing knife movably mounted on the die, the depth of the shearing knife being greater than the thickness of the die at the point where it is located, so that when the die is moved into contact with the press member the edge of the shearing knife is projected beyond the face of the die.

12. A pair of dies, each provided with shearing blades at its periphery, the shearing blades of one of the dies being movable relative to the die on which they are mounted.

13. A die having surfaces lying in different planes and having shearing blades independently movable in planes substantially normal to the adjacent surfaces of the die.

14. A die having two surfaces inclined toward each other, one of said surfaces being substantially plane and the other surface curved, ribs in the plane surface, a rib connecting the plane surface with the curved surface and shearing knives around the periphery of the die, each knife being substantially normal to the adjacent surface of the die and conforming in shape to the edge of the die.

15. A die provided with a cavity, means for supplying water to said cavity, an opening from said cavity to the top of the die, grooves in the top of the die extending from said opening, a recess at the side of the die for a shearing knife, and openings leading from said recess to said grooves.

16. A die, a casing spaced therefrom, a movable shear blade between the die and casing, said die being provided with a chamber for cooling water, and outlets leading from said chamber to the shear blade.

17. In combination, a bracket forming die, and a shear blade movably attached to the die, and arranged to work at an angle to the press member.

18. In combination, a die, a press member, holding brackets fixed thereto, and elongated holes in the brackets through which bolts pass to suspend the die body and permit of its vertical movement.

19. A die mechanism comprising a stationary member, a die movably secured to said member, a shearing knife movably mounted on said die and arranged to move at an angle to said stationary member and adapted to be actuated by contact therewith, said blade being provided with opposite cutting edges at one end and being oppositely beveled at its non-cutting end.

20. A die, a shear blade mounted thereon, said shear blade having its cutting edges conforming to the surface of the die, means for suspending the blade whereby it has a limited movement relative to the die, said blade being so formed that it can be used on opposite sides of the die.

21. In combination, a die having part of its surface curved, and a reversible shearing blade forming an edge portion of the die and having its sides curved from end to end and provided with four cutting edges.

22. In combination, a die having part of its surface curved, and a reversible shearing blade forming an edge portion of the die and having its sides curved transversely and provided with two cutting edges.

23. A concave die provided with an adjacent shear blade having one edge concave and attached to said die.

24. A die provided with a shear blade, having corner pieces arranged to be interchangeable on opposite sides of the die.

25. A die having a movable shear blade adjacent thereto and relatively movable with respect to the die, said die having a projection adjacent to the shear blade and the edge of said blade having a corresponding projection.

26. A die having a movable shear blade adjacent thereto and relatively movable with respect to the die, said die having a projection adjacent to the shear blade and the opposite edges of said blade having projections corresponding to the projections on the die and rendering the blade reversible.

27. A die having a shear blade adjacent to one side thereof, the die having a projection beside the blade and the blade having corresponding projections on two opposite edges, and bolt holes countersunk on the two sides of the blade, thus giving the die four cutting edges.

28. A die having a separator bolt attached to the outer casing and projecting through a shear blade, thereby preventing the pinching of the blade.

29. A die, a shear blade, projections upon the opposite edges of said shear blade, a recess in said die to receive the shear blade, said recess being formed with depressions to receive the projections upon the shear blade, said depressions and projections being symmetrically arranged so that the shear blade may be reversed edge for edge and end for end.

30. A die comprising two surfaces disposed at an angle, a straight diagonal rib connecting said surfaces, one of said surfaces being provided with smaller ribs on each side of said main rib and substantially parallel therewith, said smaller ribs being limited to the one surface and not extending over along the other surface.

31. In a machine for forming lugs and similar articles, the combination with coöperating forming members, one of which has a projecting ridge over which the blank is adapted to be bent by the other member; shearing blades adapted to trim the edges of said blank when so bent; and mechanism for operating the same, substantially as described.

32. In a machine for forming lugs and similar articles, the combination with cooperating forming members, of a shearing blade connected with a member for shearing the edges of the several sides of the article formed; and mechanism for operating the same, substantially as described.

33. In a machine for forming lugs and similar articles, the combination with cooperating forming members; of a shearing blade connected with a member; and mechanism for operating said members and said blade synchronously or not as desired, substantially as described.

34. In a machine for forming lugs and similar articles, the combination with cooperating forming members, of a shearing blade connected with a member; and mechanism for operating said members without the operation of said blade, substantially as described.

35. In a machine for forming lugs and similar articles, the combination with cooperating forming members; of a shearing blade connected with a member; mechanism for operating the same; and means for preventing the operation of said blade during the operation of said members, substantially as described.

36. In a machine for forming lugs and similar articles, the combination with cooperating forming members; of a support with which a member has a sliding connection; a shearing blade connected with said member; mechanism for operating the same; and means for preventing the movement of said member on said support; substantially as described.

37. In a machine for forming lugs and similar articles, the combination with cooperating forming members; of a support with which a member has a sliding connection; a shearing blade connected with said member; mechanism for operating the same; and a stop for checking the movement of said member on said support, substantially as described.

38. In a machine for forming lugs and similar articles, the combination with cooperating forming members; of a support with which a member has a sliding connection; a shearing blade having a sliding connection with said member; mechanism for operating the same; and means for checking the movement of said member on said support while permitting the movement of said blade on said member, substantially as described.

39. In a machine for forming lugs and similar articles, the combination with cooperating forming members; of shearing blades adapted to shear the edges of a plurality of sides of the article as it is formed by the members, substantially as described.

40. In a machine for forming lugs and similar articles, the combination with cooperating forming members, one of which has a projecting ridge and operative surfaces at one side of said ridge at an angle to each other; the other member having a corresponding recess and surfaces, whereby the blank is bent over said ridge and provided with angular flanges, substantially as described.

T. C. BEST.

Witnesses:
W. A. SCOTT,
A. C. COURTENAY.

---

Copies of this patent may be obtained for five cents each, by addressing the "Commissioner of Patents, Washington, D. C."